Sept. 21, 1971  J. P. MARCARIO, ET AL  3,606,891
LONG LINE BRASSIERES

Filed Feb. 26, 1970  6 Sheets-Sheet 1

INVENTORS
JOSEPH P. MARCARIO
JACK J. LoCASCIO

BY
Stewart J. Fried
Jeffrey D. Schwab
ATTORNEYS

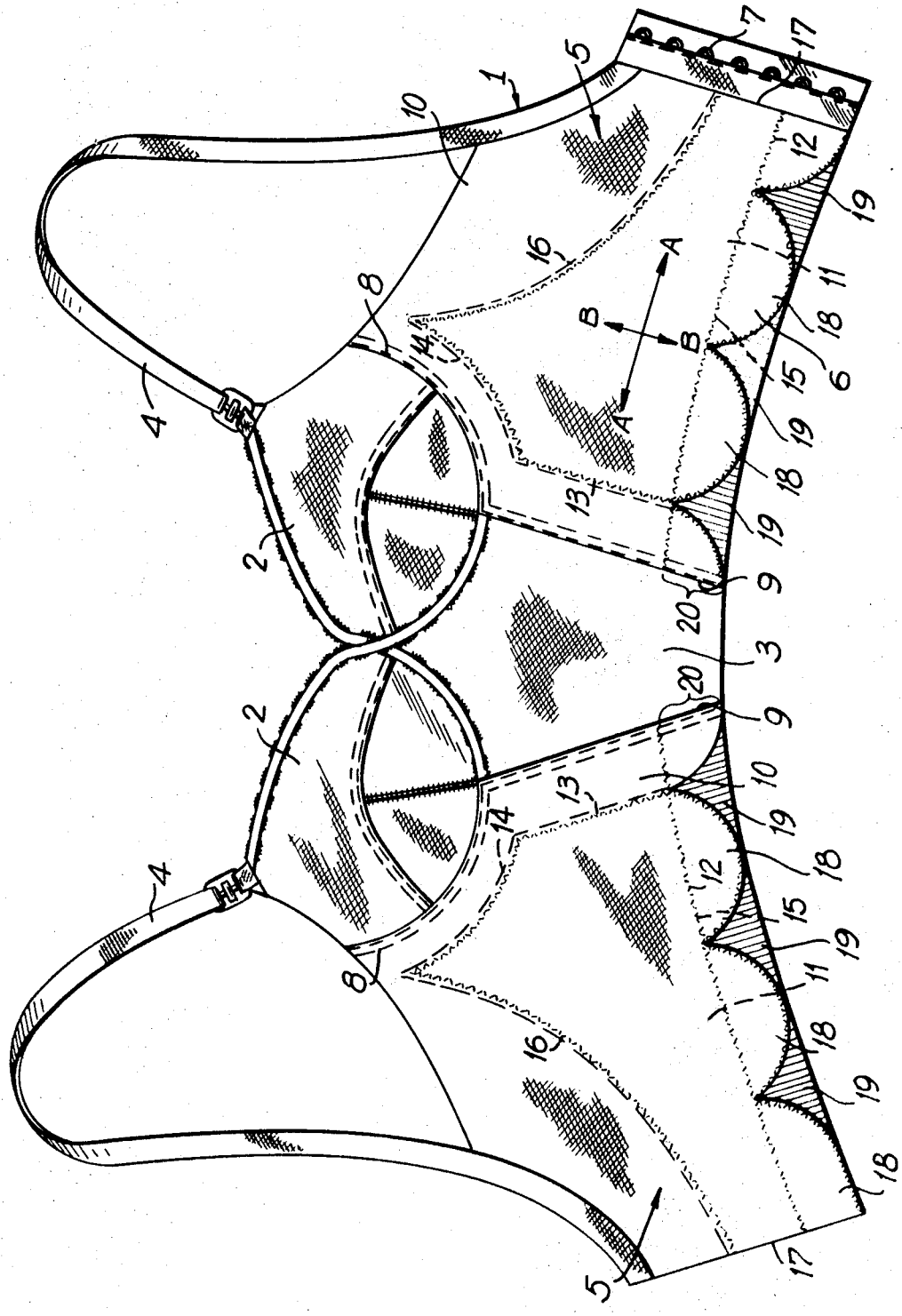

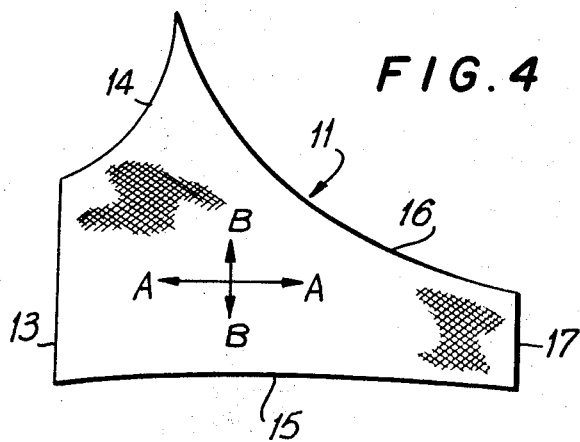
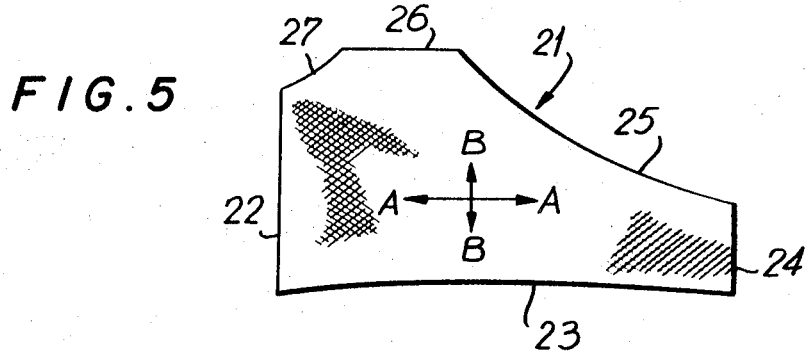
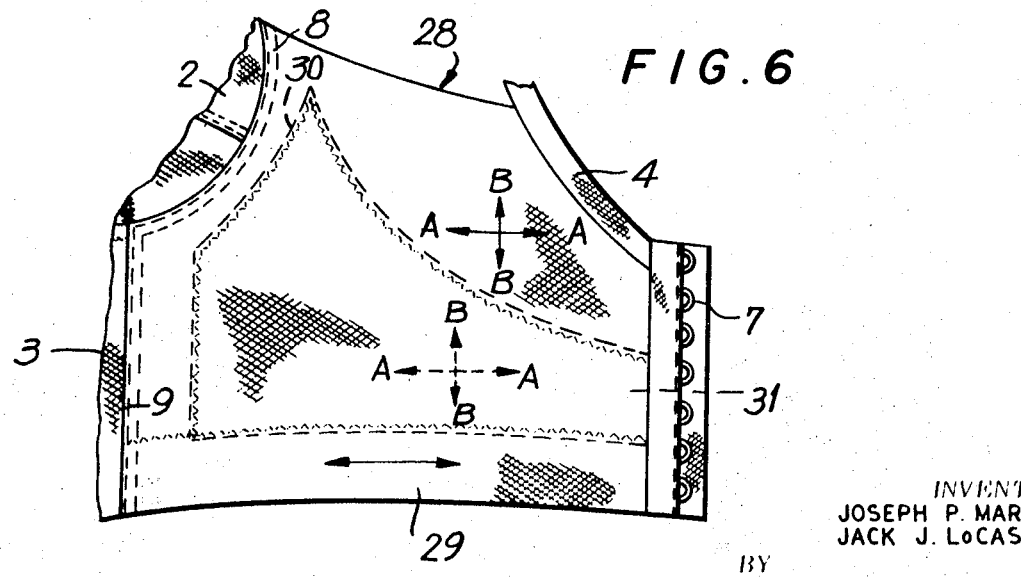

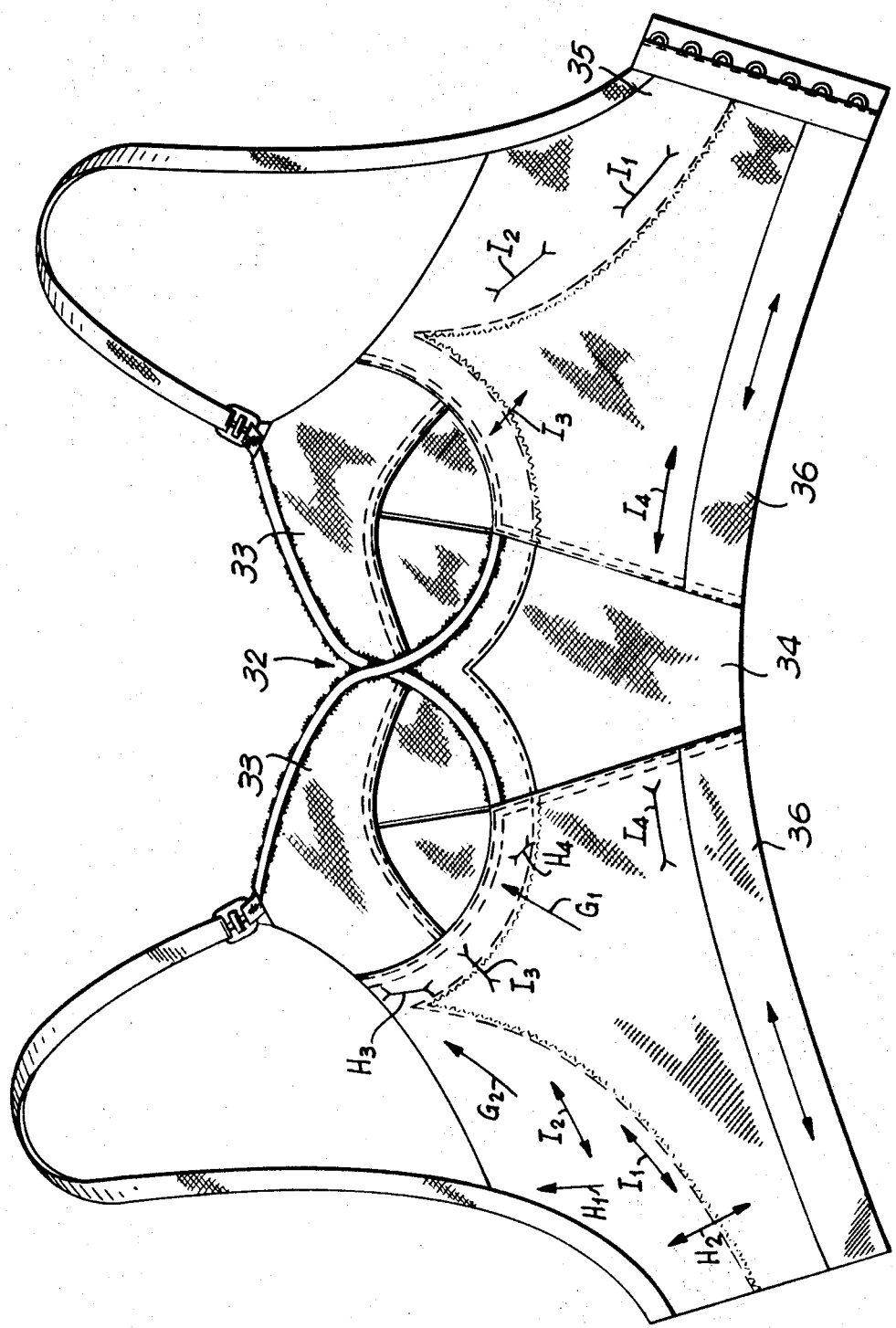

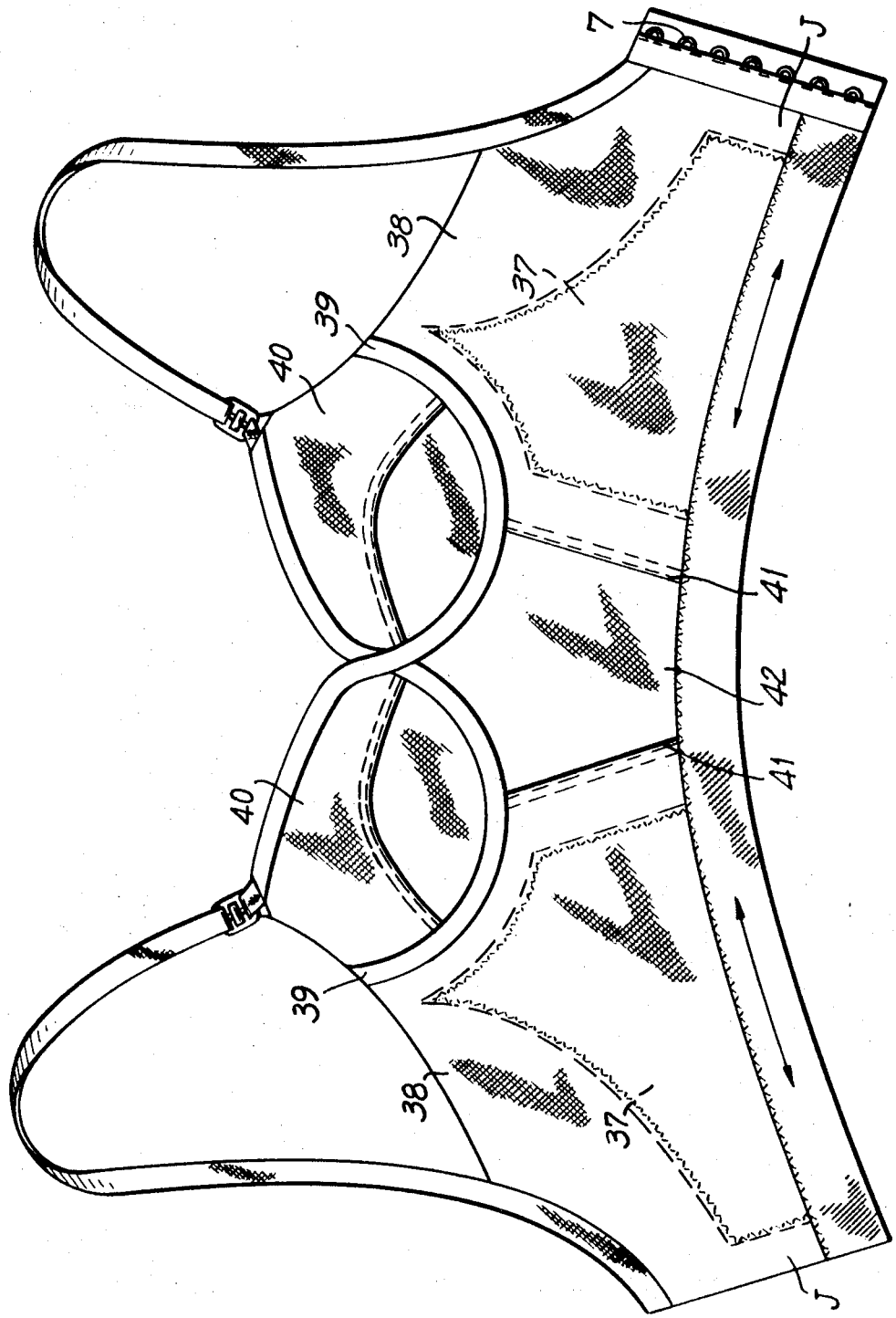

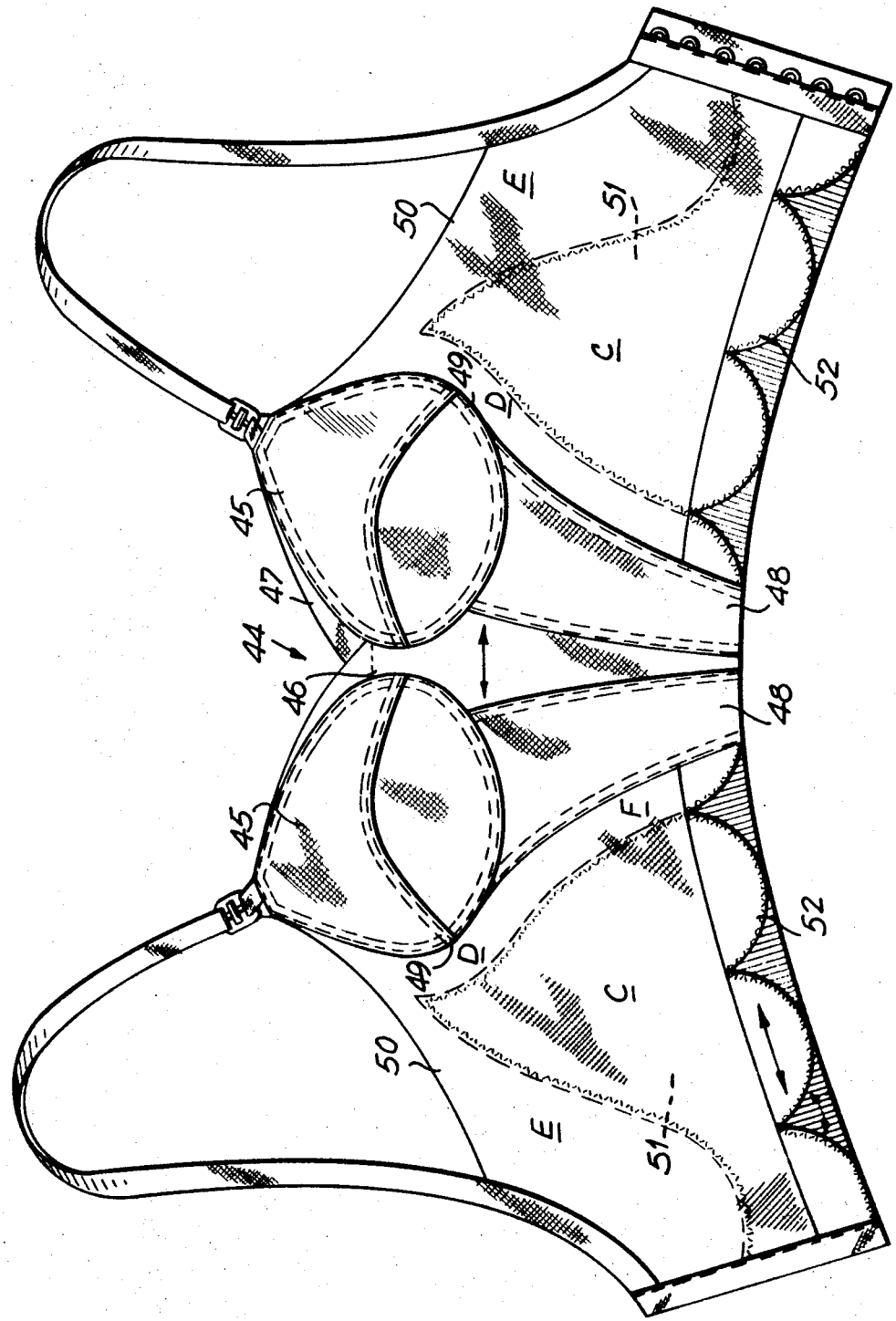

3,606,891
LONG LINE BRASSIERES
Joseph P. Marcario, Saddle Brook, and Jack J. Locascio, Bayonne, N.J., assignors to International Playtex Corporation, New York, N.Y.
Filed Feb. 26, 1970, Ser. No. 14,420
Int. Cl. A41c 3/00
U.S. Cl. 128—427
20 Claims

ABSTRACT OF THE DISCLOSURE

The long line brassiere disclosed is so constructed so as to exert and absorb to desired degrees forces in selected anatomical areas thus allowing for the elimination of stays or other rigid supports. Such is accomplished by combining with the generally non-stretchable breast cups and center panel of the brassiere, stretchable dorsal panels having a plurality of zones of varying stretch characteristics with the zone having the greatest resistance to stretch in an area relatively closely spaced apart from the breast cups and extending along the lowermost edge of the dorsal panel for the major lateral extent of such dorsal panels. There is additionally disclosed a collar which underlies the dorsal panels having zonal stretch characteristic disparity with the zones so oriented with respect to each other so as to provide a predisposition for a controlled flare of the collar along the waistline of a wearer.

---

The present invention relates to brassieres and more particularly to those garments generally referred to as long line bassieres.

In an attempt to provide in a single garment both support for the bust and control for the torso various brassieres of the long line type have been constructed. Oftentimes, these garments are little more than a line extension of a previously existing bandeau design with a long line skirt being provided beneath the bandeau. Panels or sections for restriction of certain areas of the torso are provided and some means, generally in the form of stays, are employed to prevent curling or creasing and thereby maintain the shaping of the skirt along the torso.

In more sophisticated garments, attempts have been made to balance the forces exerted during wear. Of the difficulties most often encountered in the construction of a long line garment the problem of positional retention of the skirt portion is most common. "Creep" or riding up of the skirt and curling or horizontal creasing along the bottom and sides of the skirt is a constantly reoccurring problem. In an attempt to solve these problems long line undergarments have been constructed so as to include either hold down garters which are secured to a girdle or hosiery or integral vertically extending pockets into which are placed rigid stays, bones or the like.

The stays while providing some minimal control function serve primarily as a means for maintaining the skirt in a relatively flat plane against the body with the vertically oriented stays exerting an anti-creasing and anti-curling pressure along the skirt with an aim towards thwarting undesired distortion during periods of dynamic stress such as during arm extension, sitting or turning.

While the stays do act in some measure to overcome such problems they in turn present numerous others. Oftentimes after repeated wearings and washings the stays become distorted. In other instances the pocket which carries the stay opens or is punctured by the stay and the then free end of the stay digs into the flesh of the wearer. Even in the absence of pocket punctures the stays often times jab a wearer. Further, any shifting or distortion of the stay alters the desired "balance" of the garment thus adversely affecting the fit.

For example, when a wearer of a long line extends her arms upward and outward a force is exerted diagonally from a point along the bottom edge or collar of the side or dorsal section upwards towards the outer edge of the breast cup. In order to properly maintain the fit of the long line, the skirt should selectively stretch or give along such force line. However, where the force line crosses the stay and its associated pocket the stretch or give is thwarted and instead of a selective absorption of the forces along the entire force line the tension is concentreated in a smaller area. Oftentimes this results in the buckling of the stay and/or seam line failure along the stay pocket.

Where the stays extend to the bottom edge or collar of the skirt of the long line they further impede the desirable flare along the collar or otherwise present an area of inelasticity where such might otherwise be undesirable.

Aesthetically, the stays and the pockets for them may provide an undesirable surface discontinuity along the skirt of the long line with the seam lines of the stay pockets defining ridges which are oftentimes visible through sheer or form fitting outer garments.

Some attempts have been made in the past to remedy these problems. Work has been done to improve the stays themselves such as by developing new materials for the stays in an attempt to have the stays have some degree of flexibility and retain their desired shape and strength over longer periods of use. In another direction attempts have been made to inhibit creasing along the lower edge of the skirt by use of an elastic collar specially affixed to the lowermost edge of the skirt to selectively tension the skirt portion. However, none of these prior attempts fully solved the problem.

Solving the problem of skirt retention oftentimes presented a problem in the balance of the garment with respect to the interaction desired of breast support and upper torso control. Some garments combined elastic and inelastic sections along the dorsal panel to solve this problem. While there has been some success experienced in such garments, proper fitting for different figures within a given size has been a problem. That is, for production and marketing economies it is desirable to have size standardization, with it being assumed that a given cup size wearer would have a given range of torso size. The range of figure accommodation for a given size of a long line brassiere is naturally much greater than for a bandeau which covers less body area. The problem is particularly critical where non-stretch areas (either as a panel or as a stay pocket) are present in the dorsal area since these areas have to be aligned along certain areas of the body in order to function as desired. While a fairly wide range of sizes could adapt to such garments, certain segments of long line brassiere wearers because of the nature of their proportions had to accept less than perfect fit, or had to have garments specially custom fit, with a resultant increase in cost to these consumers.

An all elastic dorsal area overcame some of the above problems since the dorsal area could stretch to given degrees of elongation and thus "customize" the fit of the dorsal area. However, the dorsal panel to function as a controlling garment had to have differing areas of elasticity and had to have at least some line of anchorage for its more resistant areas. At least one prior worker attempted to solve the anchorage problem by having the inelastic outer edges of the breast cups act as such anchorage. However, this arrangement presents at least two problems. Since the line of greatest resistance lies along the juncture of the most resistance area of the dorsal panel and the non-stretchable outer edges of the cups, freedom of the cups is impeded, and instead of the breast and cup acting together to mold and support the breast, an undesirable counteracting stress is present which acts against the freedom of the cup to mold the breast. Thus, customized shaping of the breast supports is impeded. Secondly, the stress line is along the line of greatest chest expansion. Aside from the discomfort factor a stress line so oriented would have a tendency, especially during the raising of an arm to pull the skirt upward away from the waist.

Thus, the many garments of the prior art fail to provide a long line brassiere with independent support and shaping of the breasts, both shaping and freedom along the upper torso unimpeded by stays and the ability to accommodate to the torso's relatively diverse range of body variations.

The present invention has provided such a garment. The long line brassiere of the present invention is constructed so as to comfortably exert and absorb the desired degree of forces along selected anatomical areas and at the same time balance these same forces to shape the skirt to the body and impede both riding up and creasing without untoward pressure being exerted on the body of a wearer.

It has further been found that variations in styling may be accomplished while still achieving the overall functionality of the garment and in a like manner additional areas of control can be separately dealt with such as by providing additional areas of control or support in some embodiments and not in others.

Thus, as hereinafter more particularly described the garment of the present invention may be so constructed as to provide an area of control for the fleshy side area of the body which lies below the front portion of the shoulder. Similarly control can be provided along the waistline area near the base of the rib cage without destroying the flare which is desirable along the collar of the skirt. Similarly, greater or lesser areas of control in the center panel of the skirt can be provided.

These results have been found obtainable by the combining within a long line brassiere having breast cups including non-stretchable outer edges; a front panel whose outer edges are similarly non-stretchable at least in the horizontal direction; and a stretchable and elastic dorsal panel collar; a dorsal panel having the ability to stretch and return along substantially its entire extent and including at least three zones having various stretch characteristics; with a first zone having the grestest reduction of stretch extending substantially along the lowermost edge of the dorsal panel rearward in the direction of the rear closure of the brassiere and beginning at a point along the dorsal panel spaced apart from its associated breast cup by a second zone having a lesser resistance to stretch. The third zone is preferably an extension of the second zone although preferably having a lesser resistance to stretch than the second zone and extends substantially along the upper periphery of the first zone.

As employed herein the terms "stretch characteristics" and "stretch" includes not only the ability to elongate to given degrees upon the application of given forces but in addition at least some degree of elasticity, that is the urging towards its original condition in opposition to the applied forces and the ability to return towards such original condition upon the release of such forces.

As will be hereinafter more particularly described various additional zones may be provided. For example, zones having lesser resistance to stretch than the first zone may be provided so as to space apart the first zone from the non-stretch outer edges of the center panel and also to space such first zone from the rear edge of the dorsal panel.

Preferably the zone of greatest reduction of stretch extends substantially to the rear closure area although such zone need only extend along a major portion of the lower edge of the dorsal panel.

Further, while various stretchable and elastic collars are suitable for affixation to the lowermost edge of the dorsal panel a particular flare persuading collar has been developed and found to be highly suitable. Such collar also utilizes features of stretch characteristic disparity and includes a series of substantially triangularly shaped stretchable and elastic areas serially aligned about the collar with apex of each area pointing towards the dorsal panel. The areas within the sides of each of the triangular areas have a greater ability to stretch. Thus, greatest expansion will occur along the base and lower section of the triangular area. When worn the upper section of the collar having a greater reduction in stretch will snugly, yet comfortably fit the waist or lower rib cage area and the lower section of the collar will flare to lie flat against the body.

This interaction within the collar is desirable not only to provide the supplemental anchoring hold down indicative of long line collars, but further provides both shaping and selective release. This latter feature inhibits undesired binding by the collar too tightly gripping the body resulting in a distortion of the long line during sitting or turning.

These and other features of the present invention may be further understood by reference to the following description and the accompanying drawings.

FIG. 3 is a front plan view of the brassiere of FIG. 1 off the body.

FIG. 4 is a plan view of the panel employed in the brassiere of FIGS. 1–3 to reduce the stretch of a selected area on the dorsal section.

FIG. 5 is a plan view of an alternative panel employable for the reduction of stretch.

FIG. 6 is a fractional view of an alternate long line brassiere dorsal panel shown off the body.

FIG. 7 is a front plan view of an alternate embodiment of the present invention off the body.

FIGS. 8 and 9 are front plan views of other embodiments of the present invention also shown off the body.

In referring to the figures like reference numbers denote like parts in the various figures.

Figure 1:
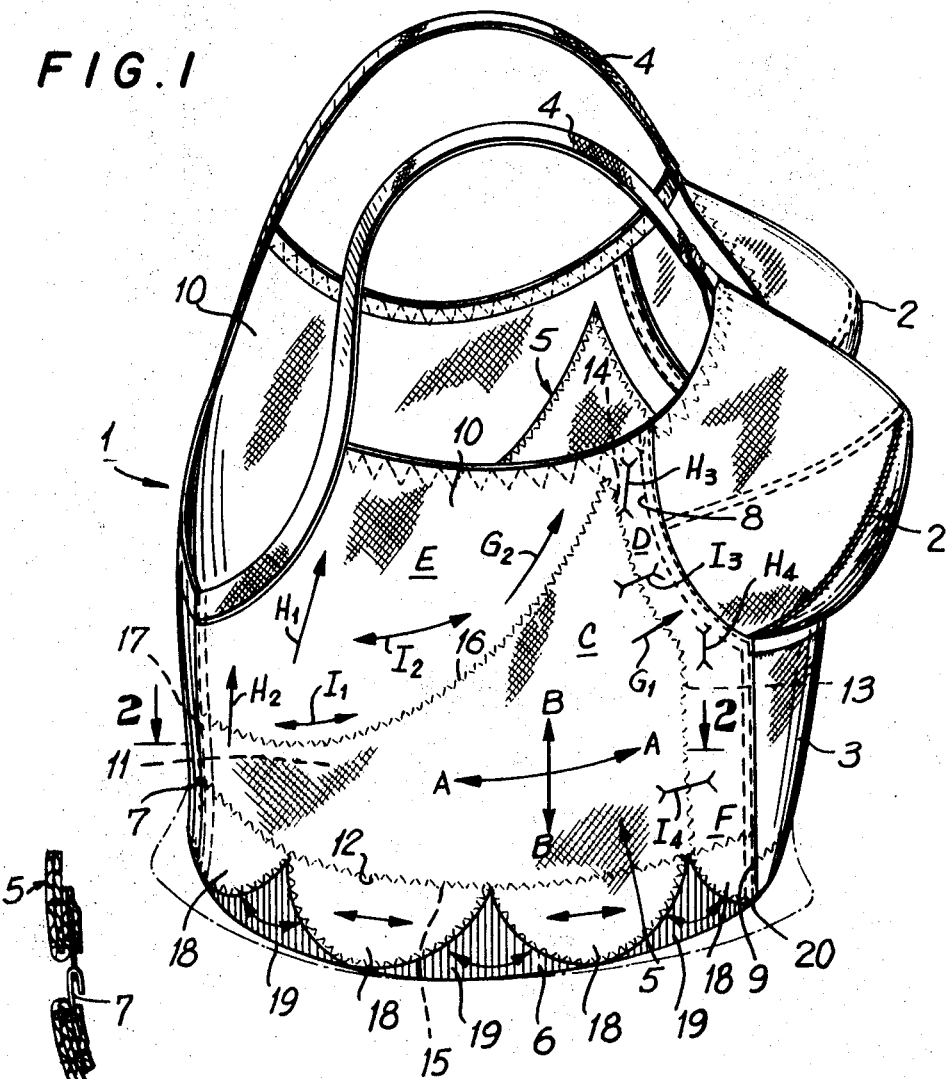
FIG. 1 is a perspective view of one form of a long line brassiere constructed in accordance with the present invention as it is worn, with the collar shown dotted to a flare position.
Figure 2:
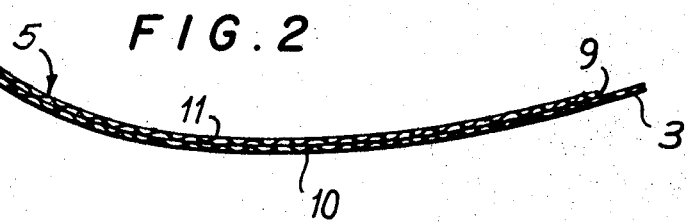
FIG. 2 is a sectional view taken along lines 2—2 of FIG. 1.

Referring to FIGS. 1–4 there is illustrated one embodiment of the present invention. As shown the long line brassiere 1 generally includes; a pair of non-stretchable breast cups 2; a non-stretchable front panel 3 extending vertically beneath at least a portion of the breast cups 2; a pair of shoulder straps 4 which may be rigid or elastic; a dorsal panel 5 on each side of the long line extending laterally outward from the outer edge 8 of its associated breast cup 2 and front panel side edge 9; a collar 6 extending along the lowermost edge of each dorsal panel 5; and a rear closure mechanism 7 which is illustrated as a hook and eye arrangement.

While the breast cups 2 has been generally stated to be non-stretchable, the rigidity with respect to the breast cups 2 need only be along the outer edges 8 of the cups 2 and that cups of yieldable material may also be employed.

Similarly while the front panel 3 has been generally referred to as non-stretchable it is only along the vertical side edges 9 of the front panel 3 that inelasticity is requisite and only horizontal inelasticity is required even along such vertical side edges 9.

The basic requisite with respect to the breast cups outer edges and the center panel side edges 9 is that they provide secure anchorage for the dorsal panel 5.

As most clearly illustrated in FIGS. 1 and 3 the dorsal panel 5 presents an unbroken panel which has the ability to stretch substantially along its entire extent and having various zones with a disparity in the stretch characteristics between at least two of the zones. While in the embodiments described herein these zones are constructed by use of an overlapping layer of somewhat similar material, other methods of effecting a similar result are possible. Thus, for example a single unit of a given material can be constructed so as to have greater or lesser stretch characteristics along certain areas with such material having at least some ability to stretch and return substantially throughout its length. Alternatively stitch application in selected areas of a single ply of a stretchable elastic material in a manner adapted to provide stretch retarding interfaces may also be employed to effect an end result of a disparity of stretch characteristics in particular zones. Alternatively contiguous alignment of two or more materials where each of the materials has different stretch characteristics may also be employed.

Whatever the means, the dorsal panel 5 includes a plurality of zones having different stretch characteristics, that is having different degrees of stretch and elasticity. Specifically referring to the construction illustrated in FIGS. 1–4 each dorsal panel 5 includes a first layer 10 of an elastomeric material such as that which is generally referred to as "power net." The first layer 10 extends from the line defined by the outer edge 8 of the breast cup 2 and the side edge 9 of the center panel 3 completely across the dorsal area and terminates at the rear closure 7 line of the long line 1.

Superimposed on the inner side of the first layer 10 is a second layer 11, also an elastomeric material such as "power net." If desired the "power nets" may be of different varieties. Securement of the two layers 10, 11 is effected in a manner such that the ability of the layers 10, 11 to stretch is not destroyed although the securement may impede the stretch to some degree. As shown in FIG. 1 this may be readily accomplished by use of zig-zag stitching although other methods are possible.

The second layer 11 illustrated in FIGS. 1–4 is somewhat pentagonal in shape having a base 15 which extends along the lowermost edge 12 of the first layer 10; an inner side 13 which extends vertically upward from the base 15, spaced apart from and somewhat parallel to the side edge 9 of the center panel 3; an arcuate side 14 which extends from such inner side 13 in spaced apart parallel relationship to a portion of the curved outer edge 8 of the breast cup 2 and terminating along the first layer 10 at a point below the upper edge of the first layer; a sloped side 16 which extends arcuately downward from the furthest vertical extension of the arcuate side 14 to terminate at the rear of the dorsal panel 5; and a rear side 17 along the terminus of the dorsal panel 5 which extends vertically between the sloped side 16 and the base 15.

As indicated by the arrows A—A and B—B in FIGS. 1, 3 and 4 the layers 10, 11 are oriented so that there is stretch and elasticity in all directions.

Where a material such as "power net" is employed stretch and elastic return in all directions is present although in fact, due to the construction of the material true stretch is present in only one direction (e.g. A—A) and "give" and return is present in directions angularly disposed to the true stretch direction (e.g. B—B and along lines at a bias to A—A).

As illustrated by the arrows A—A in FIG. 1 due to the curvature of the dorsal panel 5 the primary stretch direction of the layers 10, 11 along the rear section of the dorsal panel 5 is somewhat parallel to its lowermost edge 12 and upwardly biased with respect to such lowermost edge 12 along the forward section of the dorsal panel 5. Thus, the stretch along the forward portion of the dorsal panel 5 is slightly more retarded in the horizontal direction than it would be without such biased orientation.

Horizontally stretchable, elastic collars 6 underlie each of the dorsal panels 5 and are spaced apart by the lower section of the front panel 3. Each of the collars 6 illustrated in FIGS. 1 and 3 includes upper scalloped areas 18 and interfitting triangular areas 19 with the scalloped areas 18 having a greater resistance to stretch than the triangular areas 19. This may be readily accomplished by zig-zag stitching of a superimposed scalloped stretchable elastic material to the collar material. With the disparity in stretch characteristics thereby effected the resultant collar arrangement will not only fit snugly to the body along the line defined by the juncture of the dorsal panel 5 and the collar 6 to hold down and mold the dorsal panel to the body but will further be predisposed to release outward to a flare along the waist area.

In terms of interaction with the body of a wearer the long line 1 provides support for the breast; diaphragm control; and control, fit and comfort along the flesh areas of the upper torso.

The inner layer 11 provides within its periphery a zone C of reduced stretch which serves not only to control the midriff but further provides an area of supplemental cling which hold the dorsal panel 5 to the body and holds the skirt of the torso down. The "hold down" action of the inner layer 11 is further enhanced due to the anchorage and juxtaposition of its base 15 to its associated collar 6.

The area between the arcuate side 14 of the inner layer 11 and the non-stretchable outer edge 8 of the breast cup 9 defines a second zone D of greater stretch which provides a measure of freedom for the breast and acts as a relief zone to permit the cups to maintain the desired contouring of the breasts. Even more significantly zone D allows for expansion and contraction during breathing and as hereinafter described provides for the dissipation of forces applied to the long line during periods of dynamic stress.

The area between the upper edge of the sloped side 16 of the inner layer 11 and the upper edge of the dorsal panel 5 provides a zone E having an even greater ability to stretch than zone C and D and thus while providing desired control allows freedom for expansion for this normally wider upper torso area.

A fourth zone F between the inner side 13 of the layer 11 and the non-stretchable side edge 9 of the front panel 3 is also provided in this embodiment. Such zone F has a greater ability to stretch than the first zone C and provides a release area between the front panel and the first zone C automatically adjusting the dorsal panel to torsos of varying dimensions.

It should be noted that the resistance to stretch is less in the third zone E than the fourth zone F due to, among other things the greater area of the third zone E; the anchorage of the layer 10 to the side edge 9 of the front panel 3 in the fourth zone F and in some degree due to the bias orientation of the material in the fourth zone F as it relates to the lower edge of the dorsal panel 5.

While stretch and elasticity has been described in terms of zones, it is to be appreciated that there is a variation of stretch and elasticity in the zontal areas themselves. Thus, areas of greater resistance to stretch can be found along the interfaces between zones with the least resistance to stretch in any zone being along the freer central areas of the zones.

These zonal areas interact to both cushion and transmit the stresses most commonly applied to a long line brassiere during wear with each zone reacting not only to maintain control in the dorsal area but further acting to retain the long line in a substantially contoured fit to the body.

It is believed that this is best illustrated by observation of the working interaction of the various zones when a wearer stands upright; extends her upward and outward; during bending or sitting and when the upper torso is twisted.

It is appreciated that the interactions hereinafter described will of course vary somewhat depending upon the dimensions of a wearer in given torso areas since such factors determine to some degree the amount of stress which will be exerted to a given area.

In an upright, generally static condition the long line brassiere customizes itself to the torso. The holding power or elasticity of the entire dorsal panel 5 material serves to fit the long line brassiere to the body with adjustment for varying dimensions within a single size being effected without impairing functionality. Thus, zone D allows for latitude in breast dimension, zone E allows latitude for the natural widening along the upper underarm and back area and zone F allows latitude for rib cage dimension. As can be seen, the major forces or stresses which might otherwise distort zone C causing the long line to horizontally crease, ride up or otherwise come away from the body are dissipated. The collars 6 supplement to "hold-down" force of zone C along the lower section of zone C and the flare release of the collar 6 prevents undesirable tightness at the waist.

When the arms of a wearer are extended upward and outward the dorsal panel 5 is inhibited from creasing or riding up with the stress dissipated by the interacting zones C, D and E along the lines illustrated by the arrows $G_1$ and $G_2$ in FIG. 1. As illustrated by such arrows the major stress is absorbed along lines extending along zone D (arrow $G_1$) at its interface with zone C and along zone E (arrow $G_2$). While zone C absorbs some of the stress the major force of the stress is dissipated along the upper areas of the dorsal panel 5 in the area along zone F and is substantially absorbed before such forces can place untoward stress on the lower section of zone C.

During the act of bending or sitting different areas of the long line are placed under stress. In bending or sitting the upper torso is shortened along its front and forward size areas and elongated along its back and rear side areas.

The zonal interaction during such movement is illustrated by the arrows $H_1$, $H_2$, $H_3$ and $H_4$ in FIG. 1 with the inverted arrows connoting contraction and the extended arrows connoting elongation. Where elongation is required such as vertically along the rear areas of the dorsal panel 5, the major portion of the elongation occurs within zone E (arrows $H_1$ and $H_2$) and is substantially dissipated within zone C thus inhibiting creasing or riding up of the dorsal panel in such area. Where the torso shortens the shortening is effected along the upper areas of zones D, E and F (arrows $H_3$ and $H_4$), once again inhibiting undesirable creasing of the dorsal panel 5 or the moving of the dorsal panel 5 away from the body.

It is also of note that during sitting the collars 6 are inhibited from curling due in part to the hold down feature of the scalloped area 18. Further, where as shown in FIGS. 1 and 3 the front panel 3 extends below the dorsal panel 5 such that the lower portion of its side edge 9 are substantially aligned with the lower edges of the collars 6 a curl inhibiting line 20 extends along the forward edge of the collars 6.

During movements where the upper torso is pivoted the stress thereby encountered is absorbed along the lines illustrated by arrows $I_1$, $I_2$, $I_3$ and $I_4$ in FIG. 1. As shown during pivoting, one side of the long line brassiere experiences elongation along the rear section of the dorsal panel 5 (arrows $I_1$ and $I_2$) and a small amount of contraction occurs along the forward section of the dorsal panel 5 (arrows $I_3$ and $I_4$). Once again these stresses are absorbed without destroying the holding power of the long line and the breast cups 2 are not forced away from the busom due to the shortening of the forward portion of the chest which occur during such movement.

It should also be noted that with respect to pivoting or twisting the force lines $I_1$, $I_2$, $I_3$ and $I_4$ on the opposite dorsal panel will be reversed, that is those areas on one dosal panel which are contracted will be expanded on the opposite dorsal panels and this is most clearly illustrated in FIG. 7.

Illustrated in FIGS. 5–9 are various other embodiments of the present invention employing a disparity of stretch characteristics and zonal interaction. In all these figures there is provided a dorsal panel having the ability to stretch along its entire extent and a disparity in stretch characteristics in selected zonal regions.

FIG. 5 illustrates an alternate inner layer 21 which may be employed in lieu of the inner layer 11 of FIGS. 1–4. The lower section of the inner layer 21 is dimensionally similar to the lower section of the inner layer 11 of FIGS. 1–4, that is the inner layer 21 includes a base 23 which is the equivalent of the base 15; and inner side 22 which is the equivalent of the inner side 13; and a rear edge 24 which is the equivalent of the rear edge 17.

Further, the sloped side 25 and the arcuate side 27 have a similar curvature to the sloped side 16 and the arcuate side 14 respectively of FIGS. 1–4.

However, the sloped side 25 and the arcuate side 27 are shorter and do not meet to form the peaked triangular configuration of the layer 11 of FIGS. 1–4. Instead a sixth side 26 extending substantially parallel to the base 23 extends between the sloped side 25 and the arcuate side 27. While the elimination of the peak removes a control area in the upper underarm region it will be noted that overall functionality is not impaired and that the dorsal panel will still control and be retained in substantially flat proximity to the body during wear.

In FIG. 6 a dorsal panel 28 is illustrated having a standard horizontally elastic collar 29. It is also of note that the arcuate side 30 of the inner layer 31 while spaced apart from the non-stretch outer edge 8 of its associated breast cup 2 does not have an arc of similar curvature to the outer cup edge 8. Thus, while a zone of increased stretch is requisite between the zone of highest stretch resistance defined by the inner layer 31 and the outer breast cup edge 8, the shape of such zone, may be suitably modified depending upon the overall aesthetic desires sought to be incorporated in the long line brassiere.

As illustrated in FIG. 7 the area defined as zone F in FIG. 1 may be eliminated and the zone of greatest resistance to stretch defined by the inner layer may extend from a line contiguous with the non-stretchable side edges of the front panel. It should be noted that the elimination of the zone F does not substantially adversely effect the stress absorption characteristics illustrated by the arrows $G_1$, $G_2$, $H_1$, $H_2$, $H_3$, $H_4$ and $I_1$, $I_2$, $I_3$ in FIG. 1 although the contraction and elongation indicated by the arrow $I_4$ along the side edge of the front panel will be modified to some degree due to the greater resistance to stretch in such area. While greater restriction along the lower dorsal area is effected, principal chest expansion for breathing is provided for by the zone of greater stretch which extends between the outer edges of the breast cups and the zone of greatest restriction.

Thus as tillustrated in FIG. 7 a long line 32 is provided including non-stretchable breast cups 33; and a non-stretchable front panel 34; dorsal panels 35 having an unbroken extent of stretch of varying degrees extending from the outer cup edges and the side edges of the front panel to the rear closure portion of the long line; and horizontally stretchable and elastic collars 36 extending below the dorsal panels 35.

Of note with respect to the embodiment of FIG. 7 as well as all of the embodiments is the fact that the functional interrelationship of the parts of the long line may be readily presented in many pleasing aesthetic manners and the center panel design may be so constructed as to carry forward the aesthetic influence of the dorsal panels.

In FIG. 8 the zone of greatest resistance to stretch defined by the inner panel 37 while extending from a line spaced apart from the outer edge 39 of its associated breast cup 40 and preferably from a line spaced apart from the side edge 41 of the non-stretchable center panel 42 does not extend fully along the lowermost edge of the dorsal panel 38 to the rear closure 7 of the long line. Rather the zone of greatest reduction to stretch extends along only the major portion of the lower section of the dorsal panel 38 and terminates along a line spaced apart from the rear closure thus providing a zone J of lesser resistance to stretch near the rear closure 7. In lieu of the separate horizontally stretchable elastic collars hereinbefore described, the lowermost edge of the front panel 42 of the long line of FIG. 8 is serially aligned with the lowermost edges of the dorsal panels 38 and the collar 43 extends in an unbroken line between the rear edges of long line.

FIG. 9 is illustrative of another long line brassiere 44 incorporating the teachings of the present invention. In this embodiment the breast cups 45 are framed along their inner edges with crossing elastic members 45, 47 adapted to hug the breast. One of the elastic members 47 extends downward between two inelastic panels 48 with the extension and the inelastic panels 48 providing the center section of the long line brassiere 34. In this embodiment the center section illustrated extend from beneath the outer side edges 49 of the cups. Thus, the dorsal panels 50 are slightly narrower than the panels described with respect to other embodiments. However, as in the other embodiments the three major zones of varying stretch characteristics are present.

Zones equivalent to zones C, D and of FIG. 1 are provided. Zone C as defined by an inner stretch panel 51 provides an area of restricted stretch. Zone D provides an area of stretch less restrictive than that of zone C along the outer edge 49 of the breast cup 45. Zone E provides an area of stretch less restrictive than zone C and zone D and is contiguous to the upper periphery of zone C and extends to the rear of the dorsal panel 50.

Zone F is also provided in this embodiment since the inner panel 51 is also spaced apart from the side edges 48 of the center section, and the collars 52 for the dorsal panels 50 are similar to those described with respect to FIGS. 1 and 3.

Due to the shape of the breast cups 45 and the center section the inner panel 51 is somewhat fin shaped and is one more example of the freedom of design available within the teachings of the present invention.

It is appreciated that many other aesthetic variations will become apparent to those in the art and it recognized that various modifications are possible within the scope of the invention as claimed.

Having thus described certain forms of the invention in some detail, what is claimed is:

1. A long line brassiere comprising:
  a pair of breast cups including substantially non-stretchable outer edges,
  a center panel extending vertically beneath at least a portion of said breast cups, having horizontally non-stretchable side edges,
  a pair of dorsal panels, each dorsal panel extending laterally outward from each of said breast cup outer edges and its associated center panel side edge,
  a horizontally stretchable, elastic collar affixed to and extending along the lower edge of at least a portion of the length of each of said dorsal panels,
  each of said dorsal panels adapted to interact within said brassiere to exert selective forces along particular anatomical areas,
  each said dorsal panel having some degree of stretch substantially along its full extent and a plurality of zones,
  said zones including; a first zone of greatest stretch resistance beginning along said dorsal panel in an area relatively closely spaced apart from said outer breast cup edge and extending outwardly and laterally along said dorsal panel with a portion of said first zone substantially contiguous to the lowermost edge of said dorsal panel for the major extent of said dorsal panel;
  a second zone having a lesser resistance to stretch than said first zone contiguous with a portion of said outer breast cup edge and extending between said breast cup edge and said first zone;
  and a third zone contiguous with the upper periphery of said first zone and having a lesser resistance to stretch than said first zone.

2. A long line brassiere as claimed in claim 1 wherein said first zone is defined by a layer of elastomeric material superimposed on and affixed to its respective dorsal panel.

3. A long line brassiere as claimed in claim 1 wherein said first zone on each of said dorsal panels is spaced apart from its respective non-stretchable center panel side edge, said spacing apart defining a fourth zone of lesser resistance to stretch than said first zone.

4. A long line brassiere as claimed in claim 1 wherein said first zone extends along said lowermost edge of said dorsal panel to the greatest lateral extension of said dorsal panel.

5. A long line brassiere as claimed in claim 1 wherein said first zone extends along said lowermost edge of said dorsal panel to a line relatively closely spaced apart from the greatest lateral extension of said dorsal panel with the area between said line and said greatest lateral extention defining a zone of lesser stretch resistance than said first zone.

6. A long line brassiere as claimed in claim 1 wherein the resistance to stretch in said second zone is greater than in said third zone.

7. A long line brassiere as claimed in claim 1 wherein said second zone and said third zone are contiguous.

8. A long line brassiere as claimed in claim 1 wherein said first zone progressively narrows as it extends laterally along its respective dorsal panel.

9. A long line brassiere as claimed in claim 1 wherein said first zone defines an area having a base which extends laterally along the lowermost edge of said dorsal panel; an inner side which extends vertically upward from said base substantially parallel to said side edge of said center panel; an arcuate side which extends from said inner side in spaced apart substantially parallel relationship to a portion of the outer edge of one of said breast cups and terminating along said dorsal panel at a point below the upper edge of said dorsal panel; a sloped side which extends laterally outward and downward from the furthest vertical extension of said arcuate side; and a rear side which extends substantially vertically between said sloped side and said base.

10. A long line brassiere as claimed in claim 9 wherein the arc of said arcuate side of said first zone is substantially similar to the arc defined by the outer breast cup edge.

11. A long line brassiere as claimed in claim 9 wherein said first zone further includes a sixth side extending substantially parallel to said base between said sloped side and said arcuate size.

12. A long line brassiere as claimed in claim 1 wherein said horizontally stretchable, elastic collar includes a first area of restrictive stretch and a second area less restrictive to stretch than said first area, said second area including a plurality of tapered areas extending laterally about said collar with each of said tapered areas being wider along the lower portion of said collar.

13. A long line brassiere as claimed in claim 12 wherein said collar includes a laterally extending first length of horizontally stretchable elastic material and a laterally extending second length of scalloped stretchable elastic material superimposed and affixed to the upper portion of said first length wherein said second length defines said first area of restrictive stretch.

14. A long line brassiere as claimed in claim 1 wherein said center panel extends vertically beyond the lowermost edges of said dorsal panels.

15. A long line brassiere as claimed in claim 1 wherein said collar extends along the serially aligned lowermost edges of each of said dorsal panels and said center panel.

16. A long line brassiere as claimed in claim 1 wherein said center panel includes a first non-stretchable section juxtaposed to one of said dorsal panels; a second non-stretchable section juxtaposed to the other of said dorsal panels and a third stretchable, elastic section disposed between said first and second sections.

17. A long line brassiere comprising:
- a pair of substantially non-stretchable breast cups,
- a substantially non-stretchable center panel having side edges extending vertically beneath the inner lower edges of said breast cups,
- a pair of dorsal panels having at least some degree of stretch in substantially all directions along their entire extent extending laterally outward from each of said breast cup edges and its associaed center panel side edge,
- a horizontally stretchable, elastic collar affixed to and extending along the lower edge of each of said dorsal panels,
- rear closure means along the furthest lateral extent of each of said dorsal panels adapted to securely join said dorsal panels to form an upper torso encircling garment,
- each of said dorsal panels adapted to interact within said brassiere to exert selective forces along particular anatomical areas,
- each said dorsal panel having a plurality of zones of varying stretch characteristics,
- said zones including:
    - a first zone of greatest stretch resistance, said first zone being defined by a superimposed panel affixed to a portion of said dorsal panel, said superimposed panel comprising; a base which extends laterally along the lowermost edge of said dorsal band; an inner side which extends vertically upward from said base spaced apart and substantially parallel to said side edge of said center panel; an arcuate side which extends from said inner side in spaced apart substantially parallel relationship to a portion of the outer edge of one of said breast cups and terminating along said dorsal panel at a point below the upper edge of said dorsal panel; a sloped side which extends laterally outward and downward from the furthest vertical extension of said arcuate side; and a rear side which extends substantially vertically between said sloped side and said base at the furthest lateral extension of said sloped side and said base,
    - a second zone having a lesser resistance to stretch than said first zone, said second zone being contiguous with a portion of said outer breast cup edge and said first zone arcuate side,
    - a third zone contiguous with said sloped side of said first zone and having a lesser resistance to stretch than said first zone, and
    - a fourth zone contiguous with said center panel side edge and said first zone vertical side and having a lesser resistance to stretch than said first zone.

18. In a long line brassiere comprising of a pair of breast cups, a center panel beneath at least a portion of said breast cups, dorsal panels extending laterally outward from said breast cups and center panel and closure means adapted to securely join said brassiere to form an upper torso encircling garment the improvement comprising a horizontally stretchable elastic collar affixed along the lower edge of said dorsal panels, said collar including; a first area of restrictive stretch extending from the line of juxtaposition of said collar to each said dorsal band along the upper portion of said collar; and a second area less restrictive to stretch than said first area extending about said collar, said second area including a plurality of portions tapering outward from said first area to the lower edge of said collar.

19. The long line brassiere of claim 18 wherein said first area is defined by a layer of material superimposed and affixed to the upper portion of said collars.

20. The long line brassiere of claim 18 wherein said collar includes a laterally extending first length of horizontally stretchable elastic material and a laterally extending second length of scalloped stretchable elastic material superimposed and affixed to the upper portion of said first length wherein said second length defines said first area of restrictive stretch.

References Cited
UNITED STATES PATENTS

| | | | |
|---|---|---|---|
| 2,443,225 | 6/1948 | Cadous | 128—427 |
| 3,066,677 | 12/1962 | Steiner | 128—489 |
| 3,392,732 | 7/1968 | Holscher | 128—500X |
| 3,411,510 | 11/1968 | Child | 128—500X |

RICHARD J. SCANLAN, JR., Primary Examiner

U.S. Cl. X.R.

128—445, 500, 504